(12) United States Patent  
Mahncke et al.

(10) Patent No.: US 7,980,530 B2  
(45) Date of Patent: Jul. 19, 2011

(54) PACKING NUT FOR CONTROL VALVE

(75) Inventors: Lynn Dean Mahncke, Marshalltown, IA (US); David John Koester, Gladbrook, IA (US); Jason Gene Olberding, Marshalltown, IA (US); Andrew Kinser, Walnut, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 474 days.

(21) Appl. No.: 11/204,574

(22) Filed: Aug. 16, 2005

(65) Prior Publication Data

US 2007/0040141 A1  Feb. 22, 2007

(51) Int. Cl.
*F16K 31/50* (2006.01)
*F16K 51/00* (2006.01)
*F16K 5/04* (2006.01)
*F16J 15/18* (2006.01)

(52) U.S. Cl. .................. 251/214; 137/315.28; 277/500; 277/520

(58) Field of Classification Search .................. 251/214; 137/315.28; 277/500, 520
See application file for complete search history.

(56) References Cited

U.S. PATENT DOCUMENTS

| | | | | |
|---|---|---|---|---|
| 788,939 | A | * | 5/1905 | Noxon ........................... 277/525 |
| 1,585,087 | A | | 5/1926 | Deems |
| 2,900,201 | A | * | 8/1959 | Salmon et al. ................. 277/530 |
| 2,969,811 | A | * | 1/1961 | Freeman ..................... 137/627.5 |
| 3,319,647 | A | * | 5/1967 | Morain .......................... 137/312 |
| 4,111,392 | A | | 9/1978 | Edelmann |
| 4,175,580 | A | | 11/1979 | Kalbfleisch |
| 4,351,531 | A | | 9/1982 | Maasberg et al. |
| 4,577,873 | A | * | 3/1986 | Baumann ...................... 277/520 |
| 4,778,150 | A | * | 10/1988 | Pratt et al. .................... 251/214 |
| 4,944,488 | A | * | 7/1990 | Clayson ........................ 251/203 |
| 5,927,685 | A | * | 7/1999 | Gosling ........................ 251/214 |

(Continued)

FOREIGN PATENT DOCUMENTS

DE  4429298 A1  2/1996

(Continued)

OTHER PUBLICATIONS

International Search Report received in International (PCT) Application PCT/US2006/030627, by the European Patent Office, dated Nov. 24, 2006.
Written Opinion for Application PCT/US2006/030627 by the European Patent Office, dated Nov. 24, 2006.

*Primary Examiner* — Stephen M Hepperle
*Assistant Examiner* — Atif H Chaudry
(74) *Attorney, Agent, or Firm* — Marshall, Gerstein & Borun LLP (57) ABSTRACT

A packing nut assembly for a control valve having a valve body and a valve stem includes a packing box arranged for operative coupling to the valve body and having a primary bore sized to receive the valve stem and first and second counterbores. The first counterbore is sized to receive valve packing and the second counterbore includes internal threads. A packing nut having a central bore is sized to receive the valve stem and includes a threaded outer surface positioned to engage the second counterbore of the packing box. The packing nut includes an adjustment surface positioned to face the first counterbore, and includes an adjustment head having a plurality of tool-receiving apertures sized to receive an adjustment tool.

20 Claims, 8 Drawing Sheets

U.S. PATENT DOCUMENTS

| | | | |
|---|---|---|---|
| 6,286,810 B1 * | 9/2001 | Dole et al. | 251/304 |
| 6,629,683 B2 * | 10/2003 | Wang | 251/315.1 |
| 6,866,244 B2 * | 3/2005 | Wears | 251/214 |
| 2003/0127619 A1 | 7/2003 | Wang | |
| 2004/0155217 A1 * | 8/2004 | Wears | 251/214 |

FOREIGN PATENT DOCUMENTS

| | | |
|---|---|---|
| GB | 103795 | 2/1917 |
| GB | 413462 | 7/1934 |

\* cited by examiner

PACKING NUT FOR CONTROL VALVE

FIELD OF THE INVENTION

The present invention relates generally to control valves having adjustable packing nuts disposed about the valve stem and arranged to operatively engage the valve packing and, more particularly, to a packing nut having a plurality of holes, apertures, or other structures, sized to permit adjustment with a tool other than a conventional wrench.

BACKGROUND OF THE INVENTION

Control valves for controlling the flow of high pressure fluids and/or gases in a process system are generally well known in the art. A control element such as a valve sleeve or valve plug or the like is typically disposed within the body of the valve in a position to obstruct or permit flow through the valve. The control element is typically operatively coupled to, for example, a sliding valve stem or a rotary valve stem, which in turn is coupled to a suitable valve actuator.

As is known, the valve stem is surrounded by valve packing. In many applications, the valve packing is disposed either in a packing box or in a valve bonnet. In any event, for a variety of reasons, a packing nut is provided in order to make necessary adjustments to the valve packing. Typically, the packing nut is a hex-head nut which is sized and shaped to be adjusted using a conventional wrench.

When larger diameter valve stems are used, a conventionally-shaped hex head packing nut may be difficult to adjust due to potential interference between a conventional wrench the various other valve components that surround the packing nut. In some applications, surrounding valve components present a clearance problem for the adjusting wrench even when the valve stem is a more conventional size.

Accordingly, it may be desirable to offer an alternative to the conventional packing nut.

SUMMARY OF THE INVENTION

In accordance with an aspect of the invention, a control valve comprises a valve body having an inlet, an outlet, and a flow passage extending between the inlet and the outlet, a valve stem extending from the valve body, and a packing box joined to the valve body and having a bore sized to receive the valve stem. The bore includes a first counterbore sized to receive valve packing in a position adjacent a portion of the valve stem, and includes a threaded second counterbore. A packing nut includes a central bore sized to receive the valve stem and has a threaded outer surface positioned to engage the second counterbore, with the packing nut including an adjustment surface positioned to face the first counterbore. An adjustment head is carried by the packing nut, the adjustment head including a plurality of apertures sized to receive an adjustment tool.

In further accordance with a preferred embodiment, the packing nut includes a counterbore sized to receive a spring pack and the first counterbore is sized to receive a packing spacer. Each of the apertures may be radially extending so as to intersect the central bore of the packing nut, or may run diametrically. The packing box may include a pair of mounting flanges and a pair of access openings defined between the mounting flanges, and the apertures may be positioned to be accessible through the access openings. Preferably, the apertures comprise bores extending diametrically relative to the adjustment head. The adjustment surface of the adjustment nut may be formed in a counterbore.

The valve stem preferably includes a stepped down diameter forming an abutment, and the central bore of the packing nut may include a section having a reduced diameter sized to prevent the abutment from passing through the central bore of the packing nut. The valve stem may be a rotary stem or a sliding stem.

In accordance with another aspect of the invention, a packing nut for use with a control valve having a threaded packing box and a valve stem extending through the packing box comprises a packing nut having a central bore sized to receive the valve stem, a threaded outer surface disposed toward a first end of the packing nut, the threaded outer surface sized to threadingly engage the packing box, an adjustment surface positioned to operatively engage valve packing, and an adjustment head disposed toward a second end of the packing nut, with the adjustment head including a plurality of apertures sized to receive an adjustment tool.

According to a further aspect of the invention, a packing nut assembly for a control valve having a valve body and a valve stem comprises a packing box arranged to be operatively coupled to the valve body and having a primary bore sized to receive the valve stem and first and second counterbores, the first counterbore sized to receive valve packing and the second counterbore including internal threads, a packing nut having a central bore sized to receive the valve stem and having a threaded outer surface positioned to engage the second counterbore of the packing box, the packing nut including an adjustment surface formed in a counterbore and positioned to face the first counterbore, and an adjustment head carried by the packing nut, the adjustment head including a plurality of tool-receiving apertures sized to receive an adjustment tool.

DESCRIPTION OF THE PREFERRED EMBODIMENTS

Although the following text sets forth a detailed description of an exemplary embodiment of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

Figure 1:
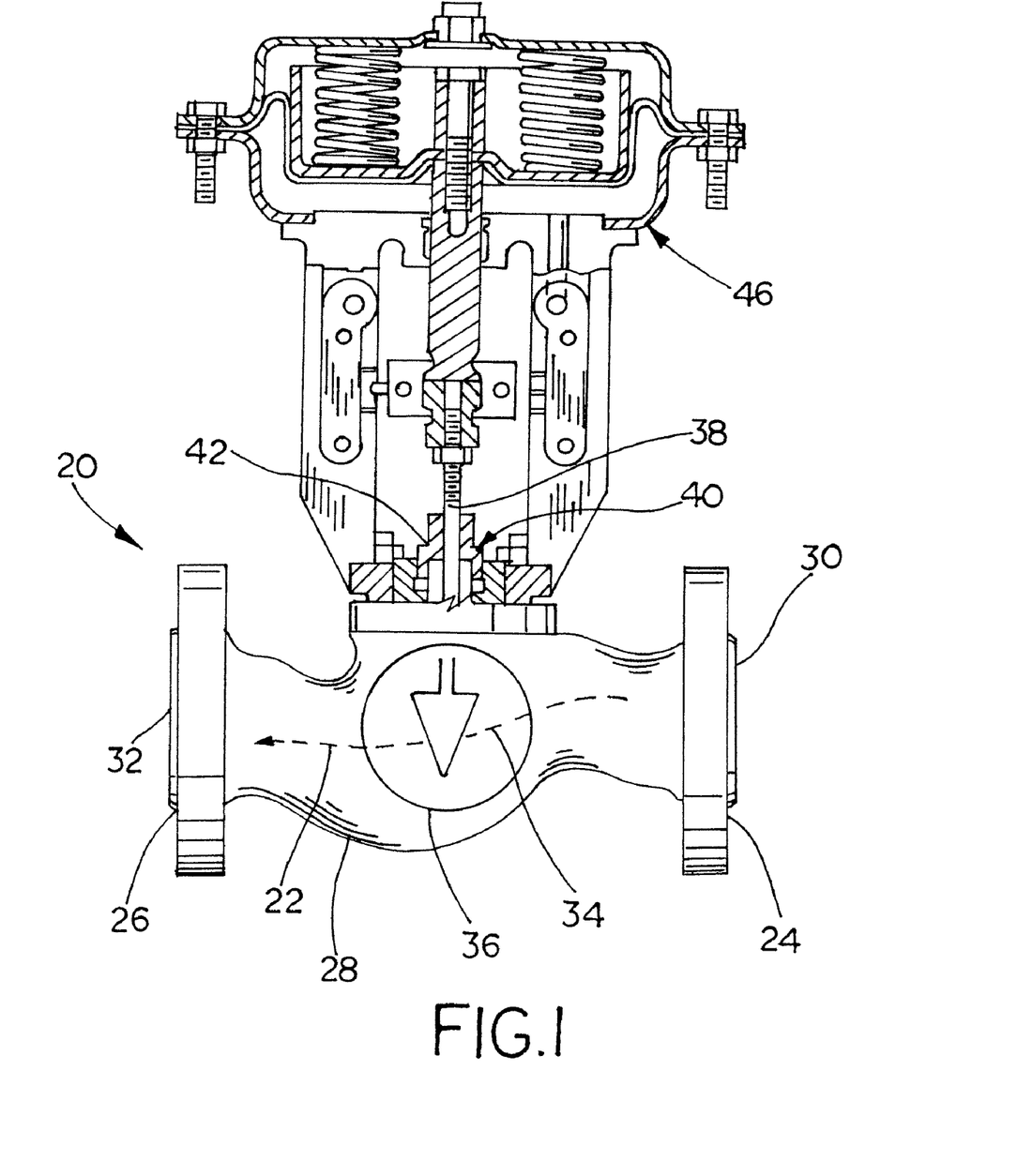
FIG. 1 is schematic view of a control valve having a packing nut assembled in accordance with the teachings of a disclosed example of the present invention.

Referring now to the drawings, FIG. 1 illustrates a control valve 20 having a valve body 22, having an inlet end 24 and an outlet end 26. A flow passage 28 is defined through the valve body 22 and includes an inlet passage 30, an outlet passage 32, and a control passage 34. A moveable control component 36 is sized and positioned to be disposed in the control passage 34, and includes a valve stem 38. The control component 36 may be a valve plug, a valve sleeve, or any other type of control component employed in the art of control valves. The valve stem 38 may be a sliding stem, a rotary stem, or any other form of shiftable valve stem. The control valve 20 includes a packing box 40 including a packing nut 42 assembled in accordance with the teachings of a first disclosed example of the present invention. The valve stem 38 extends from the control component 36 (inside the valve body 22), through the packing box 40 and the packing nut 42, to a valve actuator 46. It will be appreciated that flow through the control valve 20 is controlled by moving the control component 36 between a variety of positions as would be known, using the actuator 46 attached in any suitable manner to the valve stem 38.

Figures 2, 3, 4:
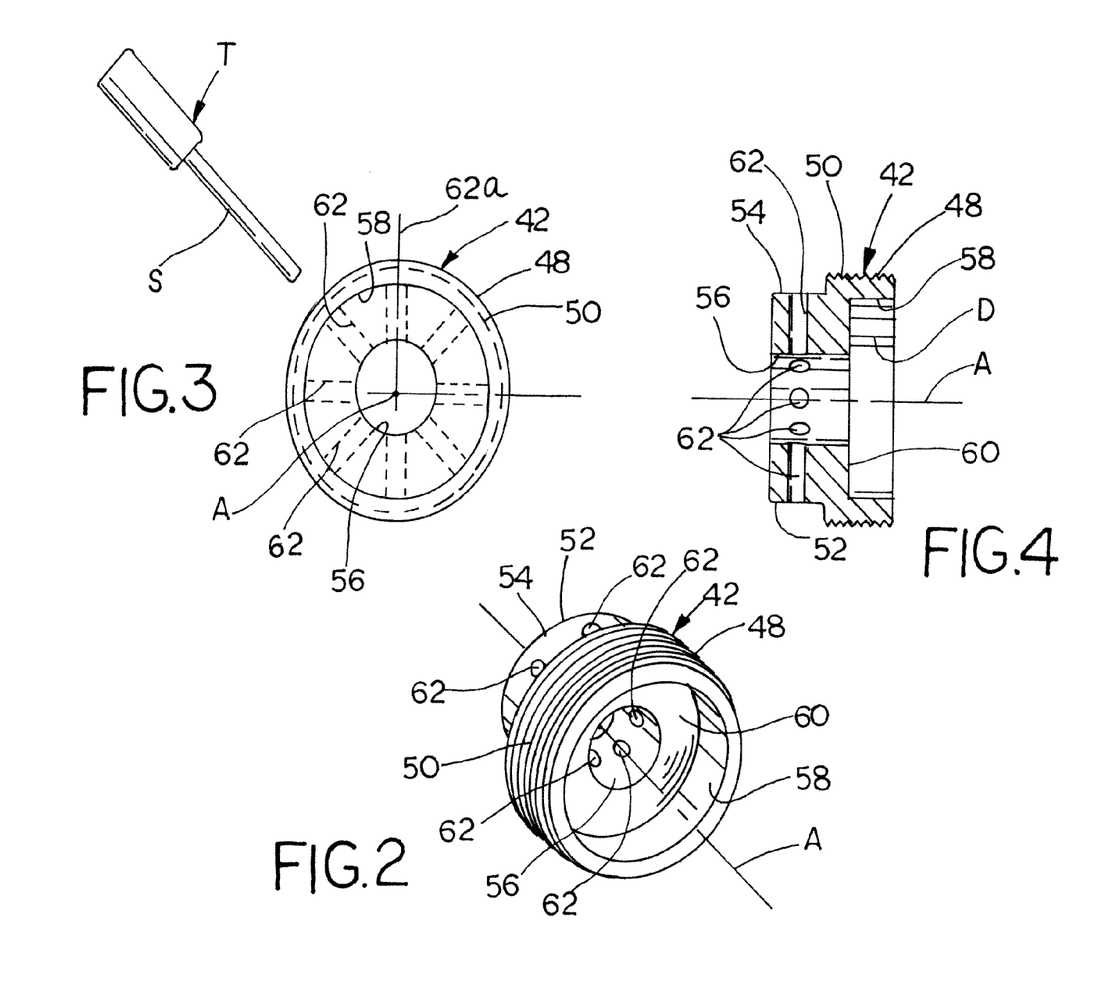
FIG. 2 is enlarged perspective view of a packing nut in accordance with the teachings of the present invention.
FIG. 3 is an enlarged elevation view off the packing nut illustrated in FIG. 2.
FIG. 4, is an enlarged cross-sectional view of the packing nut illustrated in FIGS. 2 and 3.

Referring now to FIGS. 2, 3 and 4, the packing nut 42 is shown. In accordance with the disclosed example, the packing nut 42 includes a generally cylindrical first section 48 having external threads 50. The packing nut 42 also includes an adjustment head 52 formed by a second section 54. The second section 54 may also be generally cylindrical. In accordance with the disclosed example, a diameter of the first section 48 is larger than a diameter of the second section 54. Alternatively, the first section 48 may be smaller than the second section 54, or the diameter is of both the first and second sections 48, 54 may be the same or substantially the same.

The packing nut 42 includes a bore 56 which extends generally along an axis A of the packing nut 42. In accordance with the disclosed example, the diameter of the bore 56 is sized such that the valve stem 38 may extend through the bore 56 of the packing nut 42, such that the valve stem may be moved as outlined above in order to operate the control valve 20. The packing nut 42 also includes a counterbore 58, which also extends generally along the axis A. In accordance with the disclosed example, a depth $D_1$ of the counterbore 58 is preferably less than a depth $D_2$ of the first section 48, measured along the axis A. An adjustment surface 60 is formed at the termination point of the counterbore 58. It will be appreciated that the adjustment surface 60 is oriented so as to face a valve packing assembly (discussed below), such that the packing nut 42 can be used to make suitable adjustments to the valve packing as would be known in the art.

Figures 10, 11, 12:
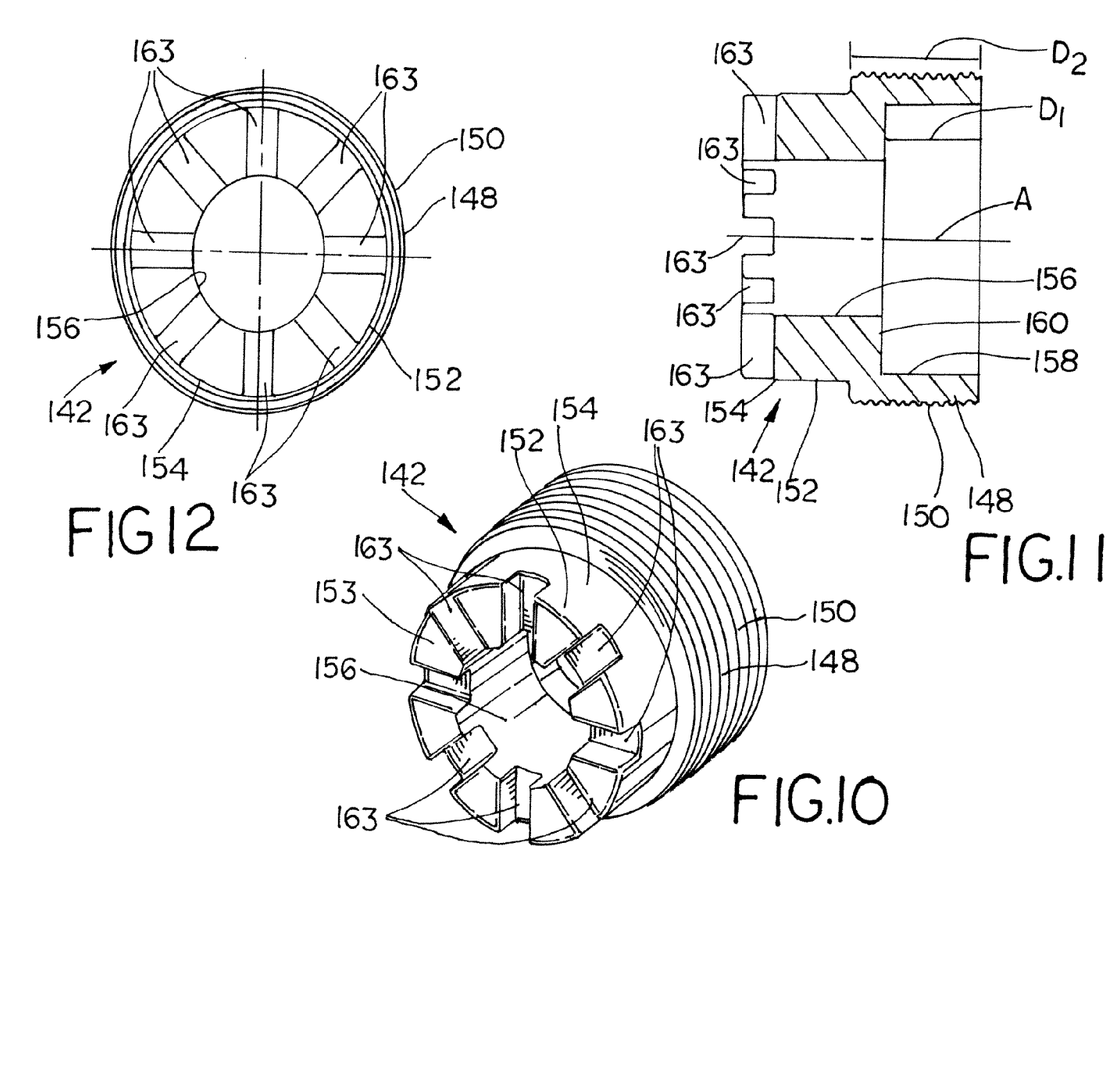
FIG. 10 is a perspective view of a packing nut similar to the packing nut shown in the foregoing Figures and illustrating the adjustment apertures taking the form of slots formed in a surface of the packing nut.
FIG. 11 is cross-sectional view of the packing nut illustrated in FIG. 10.
FIG. 12 is an end view of the packing nut of FIGS. 10 and 11 and illustrating the slots.

The second section 54 of the packing nut 42 includes a plurality of adjustment apertures 62. In accordance with the disclosed example, the apertures 62 are radially oriented and, still preferably, the apertures 62 are diametrically oriented. In the example shown, there are eight (8) radially-oriented apertures 62, or four (4) diametrically-oriented apertures 62. Additional or fewer apertures 62 may be provided. As shown, an axis 62a of each of the apertures 62 intersects the axis A of the packing nut 42. As will be discussed in greater detail below, each aperture 62 is preferably a cylindrical bore and is sized to receive an adjustment tool (described below). As an alternative, the apertures 62 need not be cylindrical, but instead may be suitably-shaped to receive any suitable adjustment tool. For example, the apertures 62 may have a round, square, hex, rectangular, or other cross-section, and the adjustment tool T need only be capable of engaging the aperture. As another alternative, the aperture may be a slot, and further may be a slot formed in the face of the second section 59 (as shown in FIGS. 10-12 and discussed in greater detail below). Further, the aperture 62 need not extend far enough through the second section 54 so as to intersect the bore 56.

Referring to FIG. 3, an exemplary adjustment tool T is shown. The adjustment tool T includes a shaft S preferably sized for insertion into any one of the apertures 62. The tool T may be a conventional tool such as a screwdriver, a drift pin, a rod, or any other suitable device.

Figure 5:
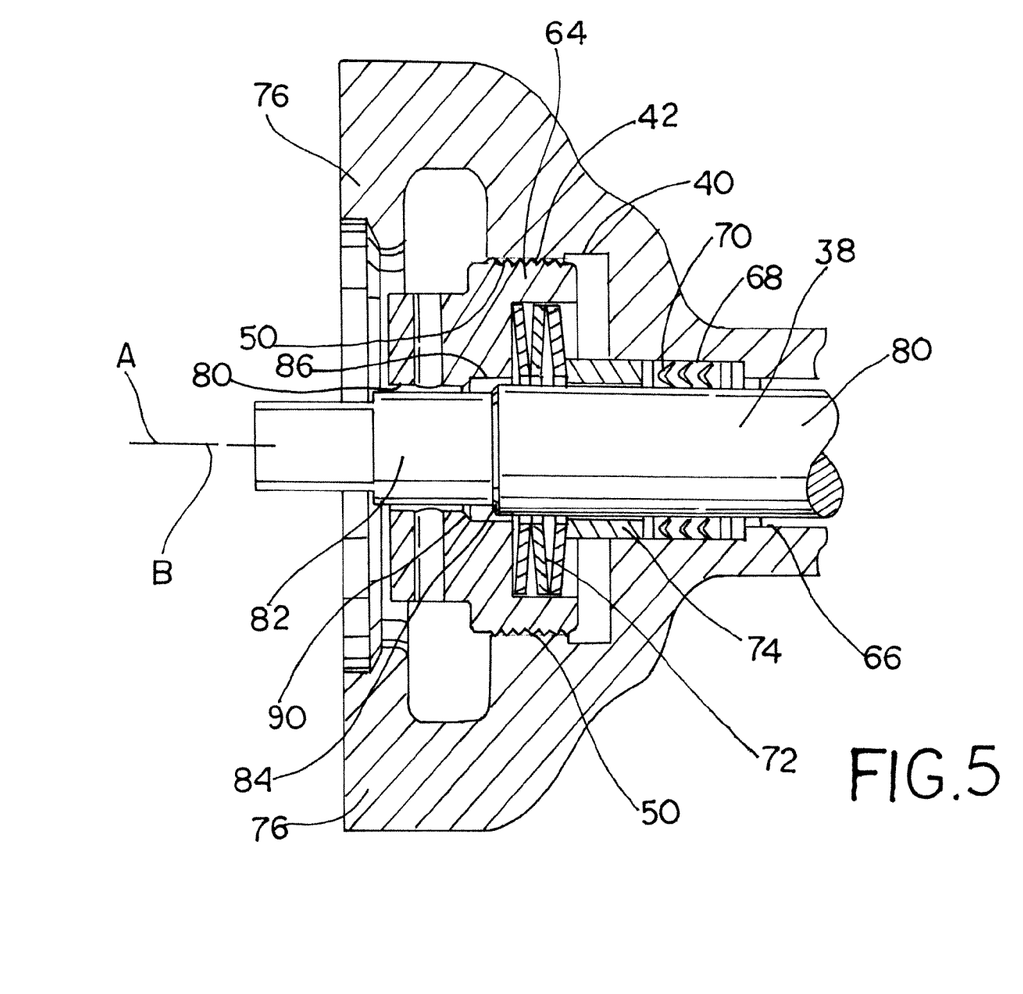
FIG. 5 is an enlarged cross-sectional view of the packing nut attached to a packing box.

Referring non/to FIG. 5, the packing nut 42 is shown disposed within the packing box 40. Accordingly, the packing box 40 includes a threaded bore 64 sized to receive the threads 50 of the first section 48 of the packing nut 42. The packing box 40 includes a bore 66 sized to receive the valve stem 38, which extends generally along an axis B. It will be appreciated that, when the packing nut 42 is disposed in the packing box 40, the axis A is aligned with the axis B. The bore 66 includes a counterbore 68, which is sized to receive a packing assembly 70. The counter bore 58 of the packing nut 42 is sized to receive a spring pack 72, which may be of the type commonly employed in the art. Typically, a packing spacer 74 is provided. As would be known, rotation of the packing nut 42 about the axis A moves the packing nut 42 along the axis A in a direction parallel to the axis of the valve stem 38, enabling a user to adjust the forces on the packing assembly 70. Preferably the packing box 40 also includes a pair of mounting flanges 76, which, in accordance with the disclosed example, allow the packing box 40 to be attached to an actuator.

In the example of FIG. 5, the valve stem 38 includes a first section 80 and a second section 82, with the second section 82 having a reduced diameter. Accordingly, a shoulder or abutment 84 is formed at the interface between the section 80 and the section 82. As is also shown in the example of FIG. 5, the bore 56 includes a first section 86 and a second section 88, with the second section 88 having a reduced diameter. Accordingly, a shoulder or abutment 90 is formed at the interface between the section 86 and the section 88. In accordance with the disclosed example, the diameters of the various sections 80, 82, 86, and 88 are sized such that the shoulder or abutment 84 formed on the valve stem 38 is positioned to contact the shoulder or abutment 90 formed inside the packing nut 42 in a manner that prevents the first section 80 of the valve stem 38 from passing through the bore 56 of the packing nut 42. It may be appreciated that the provision of the suitably sized shoulders or abutments 84 and 90 thus, in accordance with the disclosed example, may function to provide blowout protection in the event of breakage of the valve stem 38.

Figure 6:
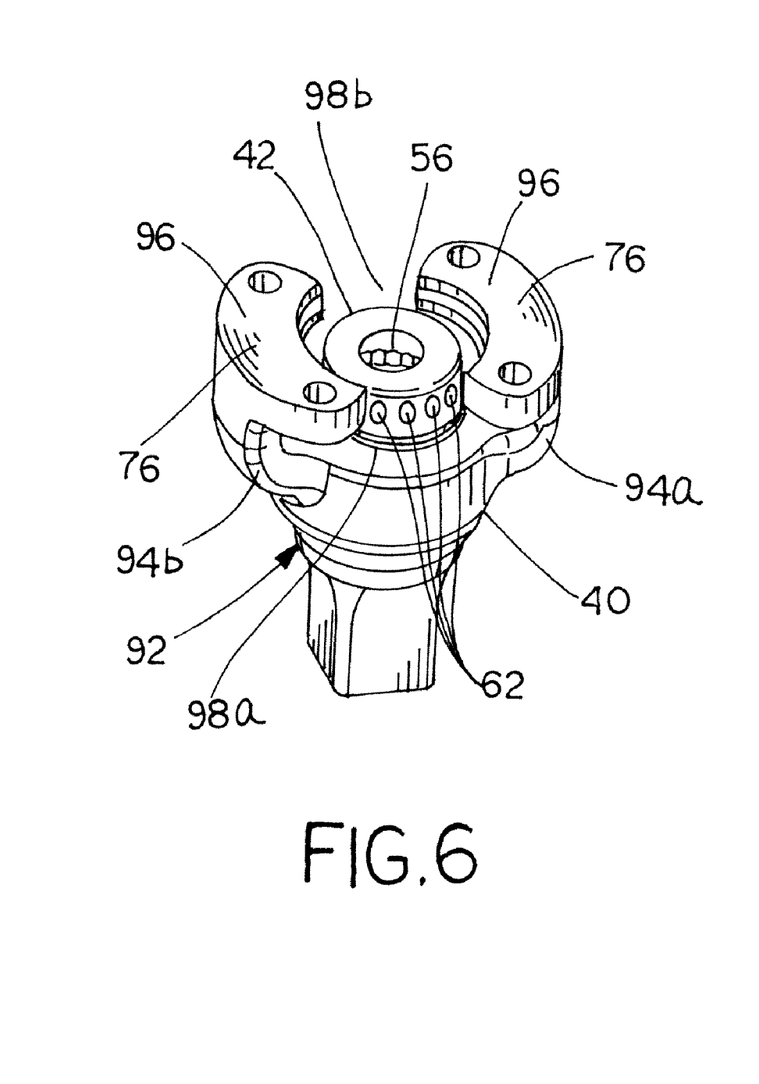
FIG. 6 is a perspective view of the packing nut shown attached to the packing box.
Figure 7:
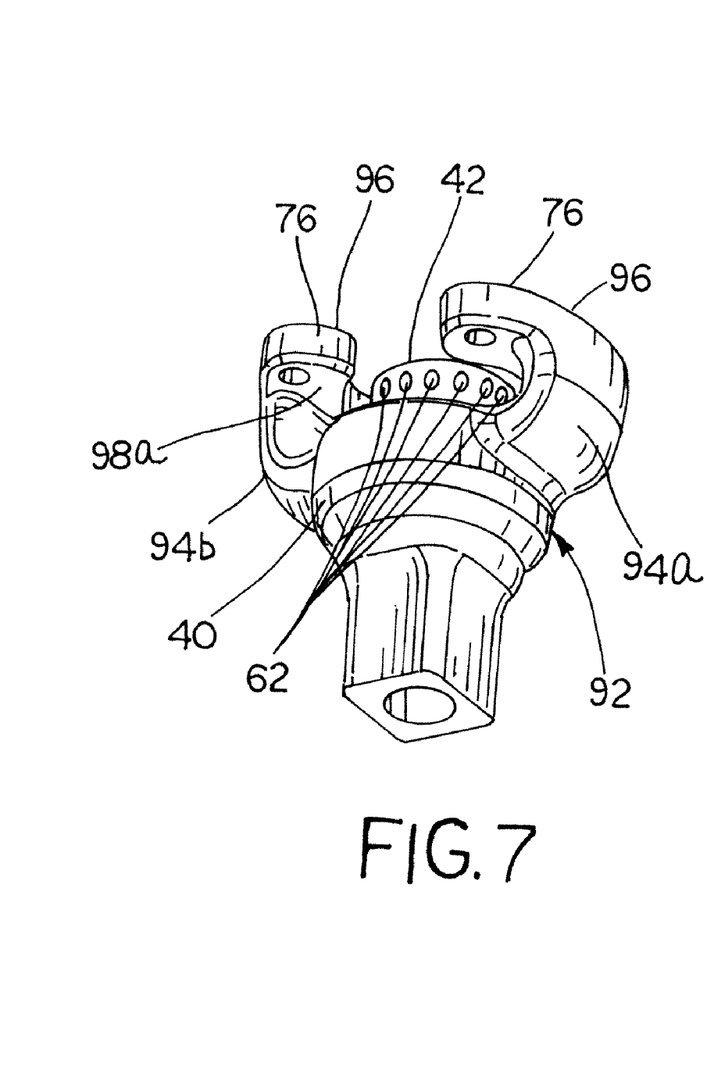
FIG. 7 is another perspective view the packing nut shown attached to the packing box.
Figure 8:
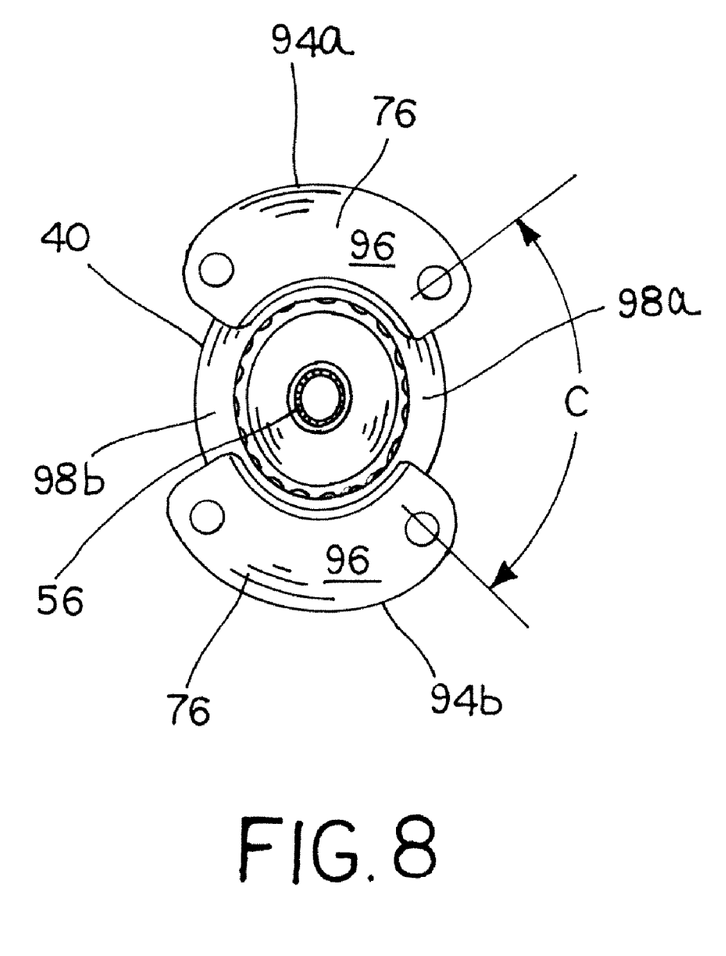
FIG. 8 is an end view of the packing nut shown attached to the packing box.

Referring now to FIGS. 6-8, the packing box 40 includes a main body 92 which is connected to the mounting flanges 76 by a pair of arms 94a and 94b. The arms 94a and 94b are shown in phantom in FIG. 8. The arms 94a and 94b are narrowed relative to the size of a mounting surface 96 on each of the mounting flanges 76. A pair of access openings 98a and 98b are formed on both sides of the packing box 40. For example, the access opening 98a (disposed toward the right when viewing FIG. 8) is formed between the arm 94a on the top and the arm 94b on the bottom (again when viewing FIG. 8), while the access opening 98b (disposed toward the left when viewing FIG. 8) is formed between the arm 94a on the top and the arm 94b on the bottom (again when viewing FIG. 8). When viewing FIGS. 6 and 7, it will be appreciated that the number of apertures 62 provided on the adjustment head 52 preferably position more than one aperture 62 in the access openings 98a and 98b at any given time, thus increasing the chances that one or more of the apertures 62 are available for adjustment by a suitable adjustment tool oriented or otherwise suitably positioned through the access openings 98a and 98b and into a selected one of the apertures 62.

In operation, the packing box 40 may be attached to the actuator in any suitable manner. The packing assembly 70, the spring pack 72, and the packing spacer 74, all may be assembled in the conventional manner, and held in place using the packing nut 42 threaded into the bore 66 of the packing box 40. Using the tool T inserted into a selected one of the access openings 98a or 98b and then into an available one of the apertures 62, the packing nut 42 may be rotated about an axis of the packing nut in a desired direction, thereby advancing or retracting the packing nut 42 in the bore 66. The rotation of the packing nut therefore places more or less compressive force on the valve packing assembly 70. Upon a partial rotation of the packing nut 42 in the desired direction, the tool T may be withdrawn for the selected adjustment bore (as the tool T eventually will encounter interference from one of the arms 94 leading to the mounting flanges 76), and the tool T may then be inserted into another one of the apertures 62). Accordingly, the packing nut 42 may be advanced and retracted as needed using any one of the available apertures 62. In accordance with the disclosed example, it will be appreciated that the packing nut can be rotated using the tool T in such a manner and through an angular range C (FIG. 8) that may not be achievable using a conventional wrench secured to a conventional packing nut having a hex-head. This is especially true on valves having a relatively larger valve stem diameter. The larger valve stem diameters, in at least some applications, tend to create clearance problems between the wrench and the arms or other portions of a packing box.

Figure 9:
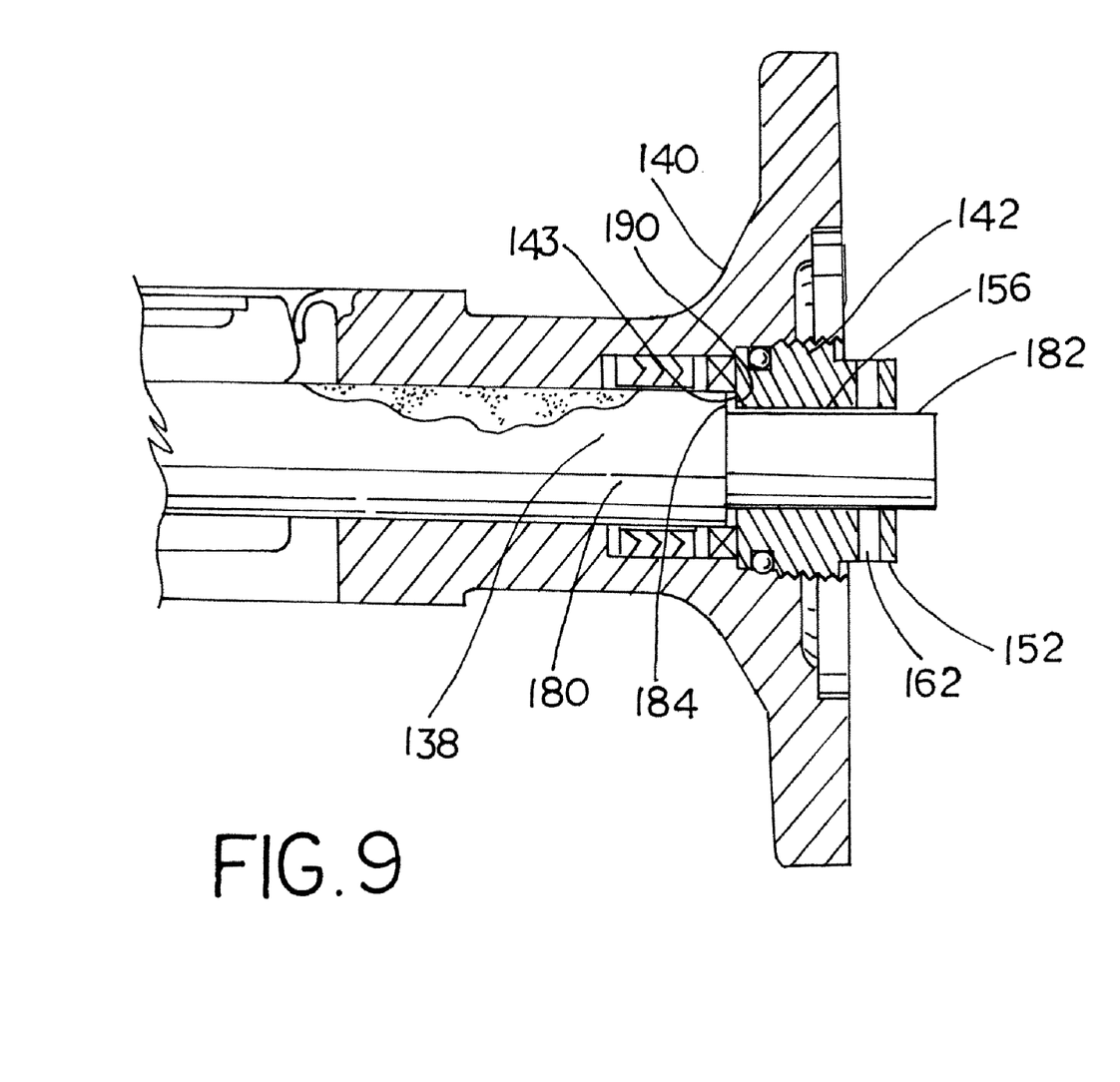
FIG. 9 is an enlarged fragmentary elevational view of a packing nut assembled in accordance with the teachings of another disclosed example of the present invention and shown attached to a packing box.

In the example of FIG. 9, a valve stem 138 disposed in a packing box 140 includes a first section 180 and a second section 182, with the second section 182 having a reduced diameter. Accordingly, a shoulder or abutment 184 is formed at the interface between the section 180 and the section 182. As is also shown in the example of FIG. 9, the packing nut 142 includes a central bore 156. An inner face 143 of the packing nut 142 forms an abutment 190. A plurality of apertures 162 are provided in an adjustment head 152 of the packing nut 142. The adjustment apertures may be the same or similar to those described above with respect to the first disclosed example. In accordance with the example of FIG. 9, the diameters of the various sections 180, 182, and the diameter of the bore 156, are sized such that the shoulder or abutment 184 formed on the valve stem 138 is positioned to contact the shoulder or abutment 190 formed inner surface of the packing nut 142 in a manner that prevents the first section 180 of the valve stem 138 from passing through the bore 156 of the packing nut 142. It may be appreciated that the provision of the suitably sized shoulders or abutments 184 and 190 thus, in accordance with the disclosed example, may function to provide blowout protection in the event of breakage of the valve stem 138.

Each of the above identified packing nuts 42 and 142 may be provided with suitable O-rings, seals, and/or other components as may commonly be used in the art. Further, except as noted, the example of FIG. 9 need not be mutually exclusive with the other example(s) shown, and each embodiment may incorporate features and structures as shown in the other embodiment.

Referring now to FIGS. 10-12, a packing nut 142 shown includes a generally cylindrical first section 148 having external threads 150. The packing nut 142 also includes an adjustment head 152 formed by a second section 154. The second section 154 may also be generally cylindrical. In accordance with the disclosed example, a diameter of the first section 148 is larger than a diameter of the second section 154. Alternatively, the first section 148 may be smaller than the second section 154, or the diameter is of both the first and second sections 148, 154 may be the same or substantially the same.

The packing nut 142 includes a bore 156 which extends generally along an axis A of the packing nut 142. In accordance with the disclosed example, the diameter of the bore 156 is sized such that a valve stem (such as any one of the valve stems discussed above with respect to the earlier-described examples) may extend through the bore 156 of the packing nut 142, such that the valve stem may be moved as outlined above in order to operate a control valve, such as the control valve discussed above. The packing nut 142 also includes a counterbore 158, which also extends generally along the axis A. As with the above-described example, a depth $D_1$ of the counterbore 158 is preferably less than a depth $D_2$ of the first section 148, measured along the axis A. An adjustment surface 160 is formed at the termination point of the counterbore 158. It will be appreciated that the adjustment surface 160 is oriented so as to face a valve packing assembly (discussed above), such that the packing nut 142 can be used to make suitable adjustments to the valve packing as would be known in the art.

The second section 154 of the packing nut 142 includes a face 153. The face 153 includes a plurality of adjustment apertures which, in accordance with the example of FIGS. 10-12, take the form of slots 163 formed in the face 153. In accordance with the disclosed example, the slots 153 are radially oriented and, still preferably, the slots 163 are diametrically oriented. In the example shown, there are eight (8) radially-oriented slots 153, or four (4) diametrically-oriented slots. Additional or fewer slots may be provided. As shown, the slots 163 intersect the bore 156, however each of the slots may be sized so as to not intersect the bore 156. Each of the slots 163 includes a generally rectangular cross-section (albeit open on one side preferably) and will accept a suitably shaped adjustment tool, such as the adjustment tool T discussed above. The slots may alternatively have a U-shaped cross-section or any other suitably shaped cross-section. The adjustment tool T may preferably have a suitably-shaped cross-section, such as a rectangular cross-section, a U-shaped cross-section, or any other suitable shape sized to engage the slots 163.

Figure 13:
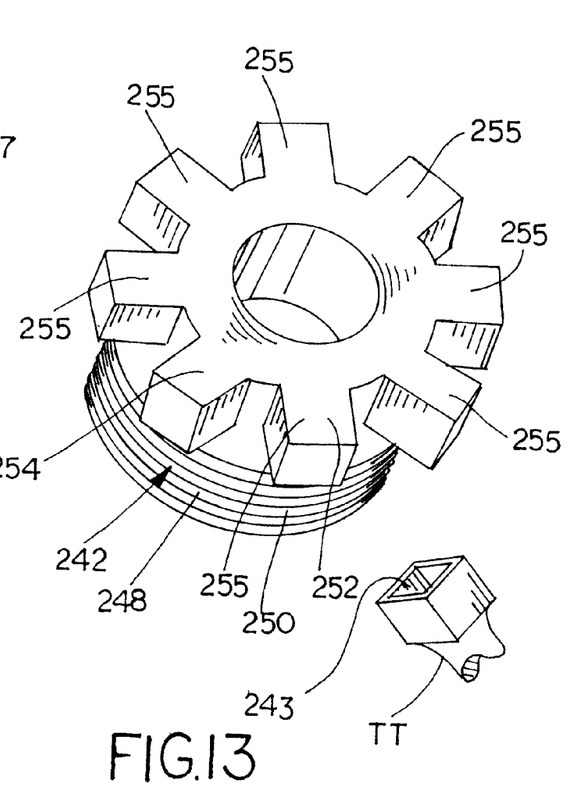
FIG. 13 is a perspective view of a packing nut assembled in accordance with the teachings of yet another example of the present invention.
Figure 14:
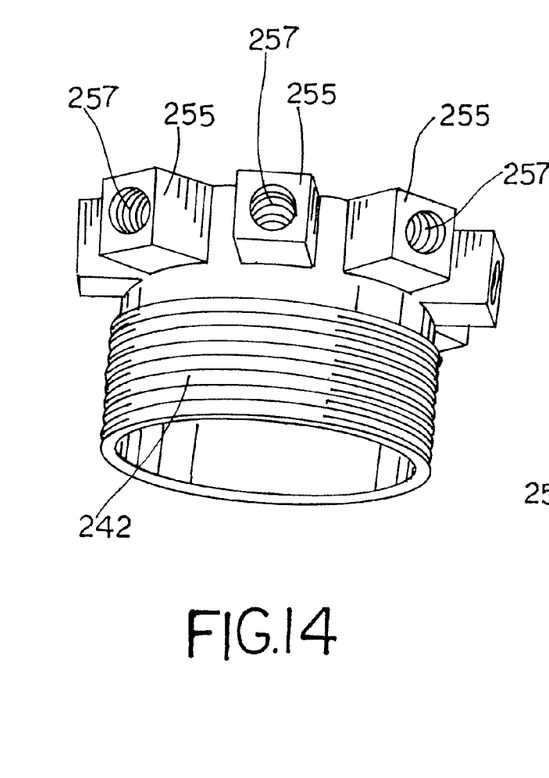
FIG. 14 is a perspective view of a packing nut similar to that illustrated in FIG. 13 but including optional holes or apertures in the ends of the protrusions.

Referring now to FIGS. 13 and 14, a packing nut 242 shown includes a generally cylindrical first section 248 having external threads 250. The packing nut 242 also includes an adjustment head 252 formed by a second section 254. The second section 254 includes a plurality of lugs 255 which, in the disclosed example, extend in a generally radially outward direction. In the example shown, the lugs are generally rectangular, but may also be cylindrical or any other suitable shape. The packing nut 242 may be similar in other respects to the packing nuts discussed above with respect to the earlier-discussed examples. A suitably-shaped tool TT includes a rectangular aperture 243 (or any other suitably-shaped aperture) designed to engage the lugs 255. Alternatively, a tool may be provided that engages more than a single lug, or that engages the space between adjacent lugs. As a further alternative, a hex-head wrench may be sized to span the width of the packing nut 242 so as to engage the flat surfaces formed by the outer ends of the lugs 255.

Referring now to FIG. 14, the lugs 255 shown therein include an optional aperture 257, which in the disclosed example is cylindrically shaped with a circular cross-section. Other shapes may be used. Once again, a suitable tool may be provided to engage the apertures 257, such as the tool T of FIG. 3. Consequently, in the example of FIG. 14 a variety of tools may be used to engage the packing nut 242.

The preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed:

1. A control valve comprising:
    a valve body having an inlet, an outlet, and a flow passage extending between the inlet and the outlet;
    a valve stem extending from the valve body, the valve stem including a stepped down diameter forming an abutment;
    a packing box joined to the valve body and having a bore sized to receive the valve stem, the packing box having a main body and narrowed pair of arms, the pair of arms terminating in separate mounting flanges each having a mounting surface, each of the pair of arms narrowed relative to a size of the mounting surface and defining access openings between the arms;
    the bore including a first counterbore sized to receive valve packing in a position adjacent a portion of the valve stem;
    the bore including a threaded second counterbore;
    a packing nut having a central bore sized to receive the valve stem and having a threaded outer surface positioned to engage the second counterbore, the central bore including a reduced diameter portion sized to prevent the abutment from passing through the central bore, the packing nut including an adjustment surface positioned to face the first counterbore;
    an adjustment head carried by the packing nut, the adjustment head including a plurality of tool accepting lugs extending radially outward from the adjustment head, the tool accepting lugs being sized and shaped to fit within an aperture of a tool which engages an outer surface of the lugs;
    the mounting flanges of the packing box sized to extend past the adjustment head of the packing nut when the packing nut is threaded into the second counterbore; and
    the access openings sized to permit access to selected adjustment apertures to allow partial rotation of the adjustment head without interference between the adjustment tool and the mounting flanges; and,
    wherein the narrowed arms and the access openings are sized to permit the packing nut to rotate through an angular range greater than an angular distance between the mounting flanges and greater than an angular range achievable using a conventional wrench coupled to a hex-head packing nut; wherein at least one of the tool receiving lugs includes a tool-receiving aperture.

2. The control valve of claim 1, wherein the packing nut includes a counterbore sized to receive a spring pack and the first counterbore is sized to receive a packing spacer.

3. The control valve of claim 1, wherein each of the apertures is radially extending and intersects the central bore of the packing nut.

4. The control valve of claim 1, wherein the apertures comprise bores extending diametrically relative to the adjustment head.

5. The control valve of claim 1, wherein the adjustment surface of the packing nut is formed in a counterbore.

6. The control valve of claim 1, wherein the valve stem is a rotary stem.

7. The control valve of claim 1, wherein the valve stem is a sliding stem.

8. The control valve of claim 1, wherein the apertures comprise radially extending cylindrical bores.

9. A packing nut for use with a control valve having a threaded packing box and a valve stem extending through the packing box, the valve stem including a stepped down diameter forming an abutment, the packing nut comprising:
    a packing nut having a first section, a second section, and a central bore sized to receive the valve stem, the central bore including a reduced diameter portion sized engage and prevent the abutment from passing through the central bore, the first section having a diameter larger than the second section;
    a threaded outer surface formed on the first section and facing a first end of the packing nut, the threaded outer surface sized to threadingly engage the packing box;
    an adjustment surface formed in a counterbore in the first section and positioned to operatively engage valve packing; and
    an adjustment head formed on the second section of the packing nut, the adjustment head including a plurality of tool accepting lugs extending radially outward from the second section of the packing nut, the tool accepting lugs being sized and shaped to fit within an aperture of a tool which engages an outer surface of the lugs; wherein at least one of the tool receiving lugs includes a tool-receiving aperture.

10. The packing nut of claim 9, wherein the counterbore is sized to receive a spring pack.

11. The packing nut of claim 9, including a channel disposed in an inner cylindrical surface of the packing nut, the channel sized to receive an 0-ring.

12. The packing nut of claim 9, wherein the apertures are radially-oriented.

13. The packing nut of claim 9, wherein the apertures extend diametrically through the adjustment head.

14. A packing nut assembly for a control valve having a valve body and a valve stem, the valve stem including a stepped down diameter forming an abutment, the packing nut assembly comprising:
    a packing box having a main body comprising a pair of arms separated by access openings and terminating in separate mounting flanges, the mounting flanges arranged to be mounted to a valve actuator, the packing box having a primary bore sized to receive the valve stem and first and second counterbores, the first counterbore sized to receive valve packing and the second counterbore including internal threads;

a packing nut having a central bore sized to receive the valve stem and having a threaded outer surface positioned adjacent a first section of the packing nut to engage the second counterbore of the packing box, the central bore including a reduced diameter portion sized to prevent the abutment from passing through the central bore, the packing nut including an adjustment surface formed in a counterbore and positioned to face the first counterbore;

an adjustment head carried by the packing nut, the adjustment head including a plurality of tool-receiving lugs extending radially outward, the tool-receiving lugs being sized and shaped to fit within an aperture of a tool which engages an outer surface of the lugs, the adjustment head having a diameter less than a diameter of the first section of the packing nut; and the pair of arms narrowed relative to a size of the mounting flanges and sized to position the mounting flanges beyond a second section of the packing nut when the first section of the packing nut is threaded into the second counterbore of the packing box, the access openings sized to permit access to at least some of the tool-receiving apertures without interference by the pair of arms; and wherein the arms and the access openings are sized to permit the packing nut to rotate through an angular range C that is greater than a distance between the mounting flanges, and wherein the angular range C is greater than an angular range achievable using a conventional wrench coupled to a hex-head packing nut wherein at least one of the tool receiving lugs includes a tool-receiving aperture.

15. The packing nut assembly of claim 14, wherein the tool-receiving apertures are arranged on the adjustment head such that the packing nut is rotatable about a central axis between a first position and a second position using only a single tool-receiving aperture through an the angular range C.

16. The packing nut assembly of claim 14, wherein the counterbore of the packing nut is sized to receive a spring pack and the first counterbore of the packing box is sized to receive a packing spacer.

17. The packing nut assembly of claim 14, wherein each of the tool-receiving apertures intersects the central bore of the packing nut.

18. The packing nut assembly of claim 14, wherein the tool-receiving apertures extend diametrically through the adjustment head.

19. The packing nut assembly of claim 14, wherein the apertures comprise cylindrical radially extending bores.

20. The packing nut assembly of claim 14, wherein the apertures comprise slots formed in the adjustment head.

* * * * *

UNITED STATES PATENT AND TRADEMARK OFFICE
CERTIFICATE OF CORRECTION

| | |
|---|---|
| PATENT NO. | : 7,980,530 B2 |
| APPLICATION NO. | : 11/204574 |
| DATED | : July 19, 2011 |
| INVENTOR(S) | : Lynn D. Mahncke et al. |

It is certified that error appears in the above-identified patent and that said Letters Patent is hereby corrected as shown below:

In the Specification:

At Column 4, line 29, "non/to" should be -- now to --.

Signed and Sealed this
Second Day of October, 2012

David J. Kappos
*Director of the United States Patent and Trademark Office*